US009803337B2

(12) United States Patent
Humphrey et al.

(10) Patent No.: US 9,803,337 B2
(45) Date of Patent: Oct. 31, 2017

(54) SYSTEM AND METHOD FOR IN-PIT CRUSHING AND CONVEYING OPERATIONS

(71) Applicant: Caterpillar Inc., Peoria, IL (US)

(72) Inventors: James D. Humphrey, Decatur, IL (US); James W. Ryan, South Milwaukee, WI (US); Paul R. Friend, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 74 days.

(21) Appl. No.: 15/044,133

(22) Filed: Feb. 16, 2016

(65) Prior Publication Data

US 2017/0233984 A1 Aug. 17, 2017

(51) Int. Cl.

| | |
|---|---|
| ***G06F 19/00*** | (2011.01) |
| ***E02F 9/20*** | (2006.01) |
| ***E02F 9/26*** | (2006.01) |
| *E02F 3/30* | (2006.01) |
| *B02C 25/00* | (2006.01) |

(52) U.S. Cl.

CPC .......... *E02F 9/2045* (2013.01); *E02F 9/2029* (2013.01); *E02F 9/2037* (2013.01); *E02F 9/2054* (2013.01); *E02F 9/262* (2013.01); *E02F 9/265* (2013.01); *B02C 25/00* (2013.01); *E02F 3/308* (2013.01)

(58) Field of Classification Search

USPC .......................................................... 701/1, 50

See application file for complete search history.

(56) References Cited

U.S. PATENT DOCUMENTS

| | | | |
|---|---|---|---|
| 6,167,336 | A | 12/2000 | Singh et al. |
| 7,574,821 | B2 | 8/2009 | Furem |
| 7,634,863 | B2 | 12/2009 | Stanek et al. |
| 7,694,442 | B2 | 4/2010 | Stanek et al. |
| 8,315,789 | B2 | 11/2012 | Dunbabin et al. |
| 8,688,334 | B2 | 4/2014 | Taylor |
| 8,768,579 | B2 | 7/2014 | Taylor et al. |
| 8,768,583 | B2 | 7/2014 | Hargrave, Jr. et al. |
| 8,868,302 | B2 | 10/2014 | Everett et al. |

*Primary Examiner* — Ronnie Mancho

(57) ABSTRACT

A control system implemented for in-pit crushing and conveying (IPCC) operations employing a shovel machine and a crusher machine is provided. The shovel machine includes an implement configured to excavate a material from a worksite and load the material into a hopper of the crusher machine. The control system includes a position determination module, an excavation determination module, and a path determination module. The path determination module is configured to determine one or more travel paths, with a plurality of loading positions, for the shovel machine and the crusher machine. The plurality of loading positions is based at least in part on the relative position of the shovel machine and the crusher machine and a plurality of excavation positions, such that at each of the plurality of loading positions, the implement traverses an arc passing above the hopper.

20 Claims, 7 Drawing Sheets

SYSTEM AND METHOD FOR IN-PIT CRUSHING AND CONVEYING OPERATIONS

TECHNICAL FIELD

The present disclosure relates to an excavating machine, and more particularly, to a control system implemented for in-pit crushing and conveying (IPCC) operations employing an excavating machine and a loading machine.

BACKGROUND

Machines, such as excavators, backhoes, and front shovels are used for excavation operations at various worksites. Such machines include an implement system that is connected to a frame of a machine at one end, and to a bucket or a shovel at another end. An operator may control the implement system for moving the shovel to perform the excavation operations. For performing a work cycle, the operator may position the implement system at a trench location. The shovel may then be moved in a downward direction till the shovel comes in contact with the ground surface. Subsequently, the operator may raise the shovel to fill the shovel with soil excavated from the ground surface, and then tilt the shovel back to capture the soil. For dumping the soil at a dump location, the operator may raise and swing the implement system to the dump location, e.g., a hopper. Further, the implement system may be swung back to the trench location for another work cycle.

In order to realize economic benefits, it is relevant that the entire work cycle is performed with accuracy. The implement system and the shovel are required to follow specific profile paths during a work cycle for ensuring an effective operation. In case of mining operations, handling of the implement system and the shovel becomes even more critical considering the sensitivity associated with the operations. For example, In-Pit Crushing & Conveying (IPCC) is a method to transport material at mining worksites from a dig location to a dump location. In the in-pit crushing and conveying system, the primary crushing takes place in a pit and then the crushed material is conveyed to subsequent process phases. Such operations at a mining worksite demand excavation of a specific amount of material from a specific ground level at specific angle of arcs by following a specific profile path for the implement system and the shovel. Usually, such operations are performed by a manual control of the machine. However, considering the complexity associated and accuracy required for the operations, it becomes difficult for the operator to execute the operations effectively. Further, the entire operation becomes dependent on a skill set of the operator. Moreover, failure to appropriately handle the implement system and the shovel for performing the operations would lead to significant production losses.

U.S. Pat. No. 8,768,579 B2 (the '579 patent) relates to a system and method for various levels of automation of a swing-to-hopper motion for a rope shovel. An operator controls a rope shovel during a dig operation to load a dipper with materials. A controller receives position data, either via operator input or sensor data, for the dipper and a hopper where the materials are to be dumped. The controller then calculates an ideal path for the dipper to travel to be positioned above the hopper to dump the contents of the dipper. The controller outputs operator feedback to assist the operator in traveling along the ideal path to the hopper. The controller also restricts the dipper motion such that the operator is not able to deviate beyond certain limits of the ideal path. In addition, the controller automatically controls the movement of the dipper to reach the hopper.

However, the '579 patent does not describe determining an optimum path of travel for the rope shovel. Also, the '579 patent does not describe determining a travel path for the hopper. Further, the '579 patent does not describe determining relative travel paths of the rope shovel and the hopper for controlling an entire operation.

SUMMARY OF THE DISCLOSURE

In one aspect of the present disclosure, a control system implemented for in-pit crushing and conveying (IPCC) operations employing a shovel machine and a crusher machine is provided. The shovel machine has an implement configured to excavate a material from a worksite and load the material into a hopper of the crusher machine. The control system includes a position determination module, an excavation determination module, and a path determination module. The position determination module is configured to determine a relative position of the shovel machine and the crusher machine. The excavation determination module is configured to determine a plurality of excavation positions for the shovel machine. The implement excavates the material from the worksite when the shovel machine is at one of the plurality of excavation positions. The path determination module is configured to determine one or more travel paths, with a plurality of loading positions, for the shovel machine and the crusher machine. The plurality of loading positions is based at least in part on the relative position of the shovel machine and the crusher machine, and the plurality of excavation positions, such that at each of the plurality of loading positions, the implement traverses an arc passing above the hopper.

In another aspect of the present disclosure, a method of implementing IPCC operations employing a shovel machine and a crusher machine is provided. The shovel machine has an implement configured to excavate a material from a worksite and load the material into a hopper of the crusher machine. The method includes determining a relative position of the shovel machine and the crusher machine. The method also includes determining a plurality of excavation positions for the shovel machine. The implement excavates the material from the worksite when the shovel machine is at one of the plurality of excavation positions. The method further includes determining one or more travel paths, with a plurality of loading positions, for the shovel machine and the crusher machine. The plurality of loading positions is based at least in part on the relative position of the shovel machine and the crusher machine, and the plurality of excavation positions, such that at each of the plurality of loading positions, the implement traverses an arc passing above the hopper.

In yet another aspect of the present disclosure, an excavating machine is provided. The excavating machine includes one or more traction units, a frame supported on the one or more traction units, and a body supported on the frame. The body is configured to rotate with respect to the frame, about an axis of rotation. The excavating machine further includes an arm pivotally extending from the body from a first end, an implement coupled to the arm at a second end; and a control system. The control system includes a position determination module, an excavation determination module, and a path determination module. The position determination module is configured to determine a position of the excavating machine relative to a loading machine. The excavation determination module is configured to determine a plurality of excavation positions for the excavating machine. The implement excavates a material from a worksite when the excavating machine is at one of the plurality of excavation positions. The path determination module is configured to determine a travel path for the excavating machine, with a plurality of loading positions, relative to the loading machine. The plurality of loading positions is based at least in part on the position of the excavating machine relative to the loading machine and the plurality of excavation positions, such that at each of the plurality of loading positions, the implement traverses an arc passing above the loading machine as the body rotates with respect to the frame about the axis of rotation.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
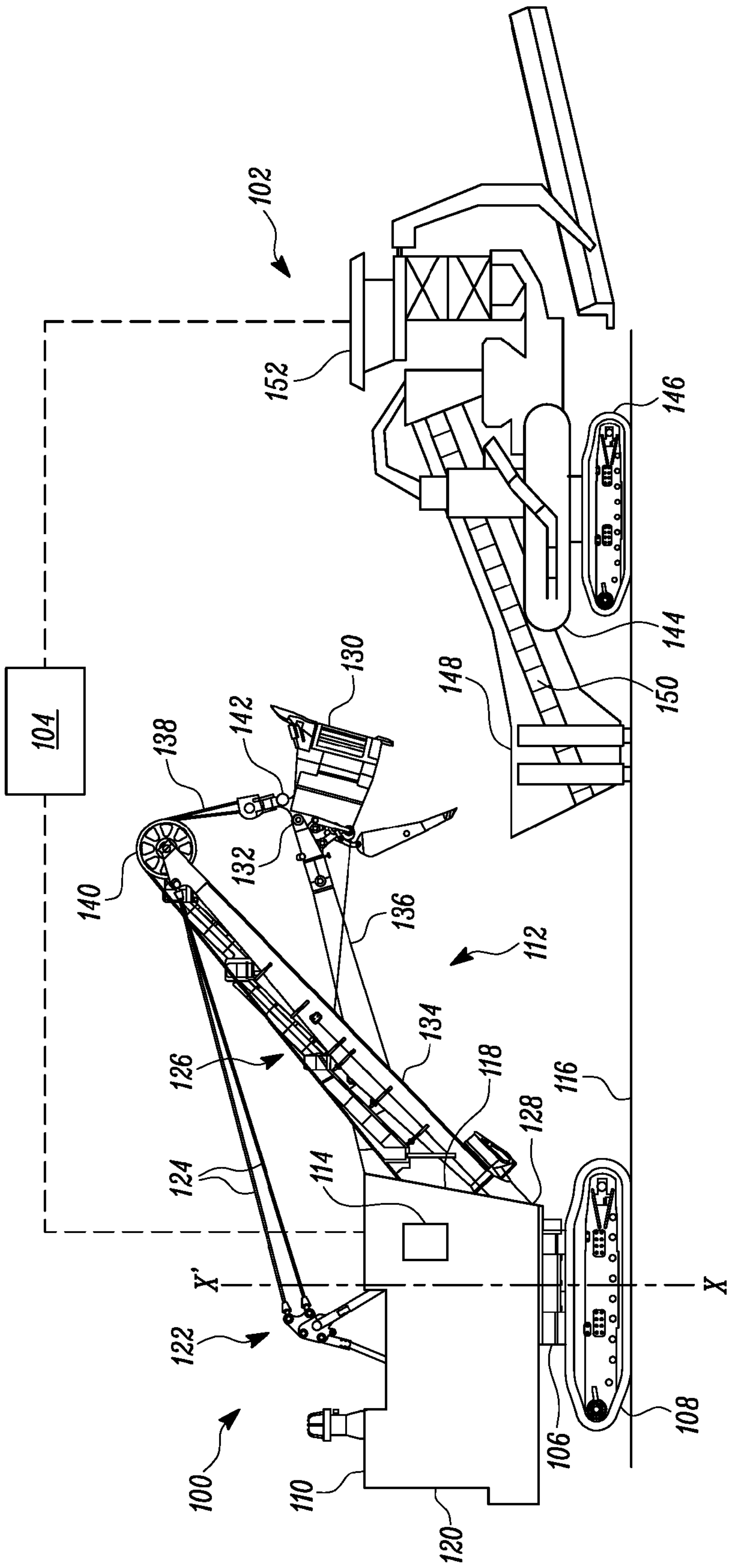
FIG. 1 is a diagrammatic illustration of an excavating machine and a loading machine in communication with a control system, according to one embodiment of the present disclosure.

FIG. 1 illustrates an exemplary excavating machine 100 and an exemplary loading machine 102 in communication with a control system 104, according to an embodiment of the present disclosure. In the present embodiment, the excavating machine 100 is a shovel machine, e.g., a rope shovel machine. Hereinafter, the term "excavating machine 100" is used interchangeably with "shovel machine 100" in the description. In other embodiments of the present disclosure, the shovel machine 100 may be replaced with other industrial machines, such as a back hoe loader, an electric mining machine, or any other construction machines that are known in the art, and more specifically with machines that make use of linkage members, without departing from the scope of the disclosure.

The shovel machine 100 may include a frame 106, one or more traction units 108 for propelling the shovel machine 100, a body 110 supported on the frame 106, an implement system 112 coupled to the frame 106, the control system 104 for determining a travel path of the shovel machine 100, and an operator station 114 for accommodating an operator. The traction units 108 may be understood as ground engaging members that are in contact with a ground surface 116 for moving the shovel machine 100 on the ground surface 116. In the present embodiment, the traction units 108 include a pair of tracks. In another embodiment, the traction units 108 may include a set of wheels (not shown) disposed each at a front end 118 and a rear end 120 of the shovel machine 100. In yet another embodiment, the shovel machine 100 may be stationary, with the frame 106 being a stationary platform in direct engagement with the ground surface 116.

The body 110 of the shovel machine 100 may be rotatably mounted on the frame 106. During an operation of the shovel machine 100, the body 110 of the shovel machine 100 may swing or rotate through a full range of 360 degrees in either direction, about a substantially vertical axis of rotation X-X', with respect to the frame 106. The body 110 may include a drive motor (not shown) mounted thereon which rotates a swing pinion (not shown) through a speed reduction gear train of a transmission (not shown) for selectively rotating the body 110 on the frame 106. It should be noted that the term "swing operation" used herein refers to a full or a partial rotation of the body 110 in a clockwise or anti-clockwise direction with respect to the axis of rotation X-X'.

The shovel machine 100 may further include a gantry member 122 mounted on the body 110. The gantry member 122 may be a structural frame member for anchoring one or more suspension cables 124 to the body 110. The suspension cables 124 may extend from the gantry member 122 to the implement system 112 for transferring a weight of components of the implement system 112 to the body 110.

The implement system 112 may include an arm 126 and an implement 130 coupled to the arm 126. At a first end 128, the arm 126 may be connected to the front end 118 of the shovel machine 100, and at a second end 132, the implement 130 may be connected to the arm 126. The arm 126 may further include a boom member 134 pivotally connected to the body 110 and an implement handle 136 pivotally connected to the boom member 134 along the length of the boom member 134. At one end, the implement handle 136 may be connected to the boom member 134, whereas at the other end, the implement handle 136 may be connected to the implement 130. In the present embodiment, the implement 130 may be a shovel bucket.

The boom member 134 may be constrained at a desired vertical angle relative to the ground surface 116 by the suspension cables 124. Further, one or more hoist cables 138 may extend from the body 110 around a first pulley mechanism 140 disposed at a distal end of the boom member 134 and around a second pulley mechanism 142 of the implement 130. Therefore, the position and movement of the implement 130 may be controlled by reeling in and spooling out the suspension cables 124 and the hoist cables 138. For example, when the suspension cables 124 are reeled in, an effective length of the suspension cables 124 may decrease causing the implement 130 to rise and tilt backward away from the ground surface 116. In another example, when the suspension cables 124 are spooled out, the effective length of the suspension cables 124 may decrease causing the implement 130 to lower and tilt forward toward the ground surface 116.

The operator station 114 may accommodate the operator to control operations of the shovel machine 100. The operator station 114 may include a plurality of control equipment (not shown) for the operator to control the operations of the shovel machine 100.

The shovel machine 100 may further include an engine enclosed in an engine compartment (not shown) to provide driving power to the shovel machine 100 and the implement system 112. In an example, the engine may produce a mechanical power output or an electrical power output that may further be converted to a hydraulic power for moving the implement system 112.

In an in-pit crushing and conveying (IPCC) operation, the excavated material is first stored in the implement 130 of the shovel machine 100, then the implement 130 swings to be positioned right above the loading machine 102, and then the implement dumps the material into the loading machine 102. The IPCC operation, as described herein, may include any type of mining operation involving transfer of material from one machine to another. The control system 104 may determine a travel path for the shovel machine 100 relative to the loading machine 102 during the excavation and loading operation. The control system 104 is in communication with the shovel machine 100 as well as the loading machine 102. The control system 104 may determine the travel path in order to ensure productive and effective operations of the shovel machine 100 and the loading machine 102. The control system 104 is explained in detail in the description of FIG. 2.

In the present embodiment, the loading machine 102 is a crusher machine. Hereinafter, the term "loading machine 102" is used interchangeably with "crusher machine 102" in the description. In other embodiments, the crusher machine 102 may be replaced with other industrial machines, such as a dump truck, or any other material storing machine, and more specifically with machines that can receive material, without departing from the scope of the disclosure.

The crusher machine 102 may include a frame 144, one or more ground engaging members 146 for propelling the crusher machine 102, a hopper 148 to receive material from the implement 130 of the shovel machine 100, a conveyor system 150 to transport the material to a crusher 152 for crushing the material received in the hopper 148, from the implement 130 of the shovel machine 100. In one embodiment, the crusher 152 may be a twin roll crusher.

Figure 2:
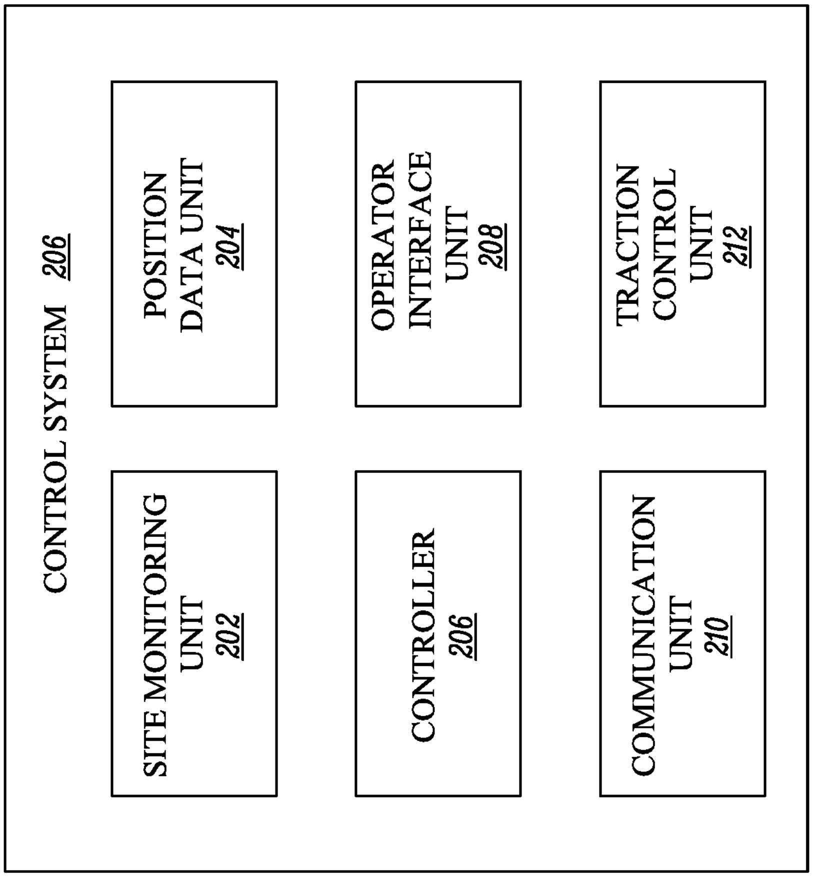
FIG. 2 is a block diagram of the control system, according to one embodiment of the present disclosure.

FIG. 2 illustrates a block diagram of the control system 104, according to one embodiment of the present disclosure. The control system 104 may be implemented for IPCC operations, employing the shovel machine 100 and the crusher machine 102. The control system 104 may include a site monitoring unit 202 for determining topography of a worksite, a position data unit 204 for determining a location of the shovel machine 100 and the crusher machine 102, a controller 206 for determining the travel paths of the shovel machine 100 and the crusher machine 102, one or more operator interface units 208 for interacting with operators, one or more communication units 210 for exchanging data between the shovel machine 100 and the crusher machine 102, and one or more traction control units 212 for controlling the traction units 108 and the ground engaging members 146 of the shovel machine 100 and the crusher machine 102, respectively.

In one embodiment, the site monitoring unit 202 may determine topography of the worksite. For this purpose, the site monitoring unit 202 may include a set of perception sensors, such as stereo imaging cameras, mono imaging cameras, structured light cameras, Light Detection and Radiation (LiDAR) equipment, and a Radio Detection and Ranging (RADAR) equipment. The site monitoring unit 202 may further determine obstacles in the travel paths of the shovel machine 100 and the crusher machine 102, and obstructions in an arc traversed by the implement 130 or in a range of motion of the implement 130 of the shovel machine 100. For this purpose, the site monitoring unit 202 may include proximity sensors or any of the perception sensors which may detect any obstacle or object present in a predefined proximity of the shovel machine 100 and the crusher machine 102. For example, the site monitoring unit 202 may include a set of cameras installed on the shovel machine 100 and the crusher machine 102 for providing a video feed of surroundings of the shovel machine 100 and the crusher machine 102 during operation, and detect any obstacles in the paths of the shovel machine 100 and the crusher machine 102, and/or the implement 130 by using some image processing algorithms.

The position data unit 204 may collect data related to a position of the shovel machine 100 and the crusher machine 102. The position data unit 204 may collect such details using one or more of a Global Positioning System (GPS), a Global Navigation Satellite System (GNSS), trilaterati on or triangulation of cellular networks or Wi-Fi networks, Pseudo satellites (Pseudolite), ranging radios, and the perception sensors.

The controller 206 may determine the travel paths for the shovel machine 100 and the crusher machine 102 for excavation and loading of the material, respectively. The controller 206 may determine the travel paths based on the topography of the worksite as determined by the site monitoring unit 202, and the position of the shovel machine 100 and the crusher machine 102 as determined by the position data unit 204. The construction and functionality of the controller 206 is explained in detail in the description of FIG. 3.

The operator interface units 208 may provide the travel paths and other instructions to the operators of the shovel machine 100 and the crusher machine 102. In one example, the operator interface units 208 may include, but are not limited to an audio device, a video device, and an audio-video device. In one embodiment, the operators may provide instructions to the control system 104 through the operator interface units 208. For example, a touch-screen enabled device may be used as the operator interface unit 208, and the operator may provide the instructions by using the touch-screen functionality of the operator interface unit 208. In one embodiment, the controller 206 may forward the travel paths of the shovel machine 100 and the crusher machine 102 to the respective operators through the respective operator interface units 208 provided in the shovel machine 100 and the crusher machine 102, respectively.

The communication units 210 may be installed in both of the shovel machine 100 and the crusher machine 102 for exchanging data pertaining to the control system 104. In one embodiment, the communication units 210 may exchange the position data between the shovel machine 100 and the crusher machine 102. In another embodiment, the controller 206 may forward the travel path of the crusher machine 102 from the shovel machine 100 to the crusher machine 102, via the communication units 210.

Based on the travel path determined by the controller 206, the traction control units 212 may operate the traction units 108 and the ground engaging members 146 of the shovel machine 100 and the crusher machine 102, respectively. The traction control unit 212 may operate the traction unit 108 and the ground engaging members 146 in such a manner that the shovel machine 100 and the crusher machine 102 travel within predefined limits of the travel paths as determined by the controller 206. In an embodiment, the one or more operator interface units 208 display the determined travel paths for perusal of the one or more operators of the shovel machine 100 and the crusher machine 102. The predefined limits of the travel paths may be defined based on a type of operation to be performed and dimensional characteristics of the shovel machine 100 and the crusher machine 102.

In one embodiment, the control system 104 may be disposed in the shovel machine 100 and simultaneously be in communication with the crusher machine 102 as well. In another embodiment, the control system 100 may be disposed in the crusher machine 102 and simultaneously be in communication with the shovel machine 100 as well. In yet another embodiment, the control system 104 may be disposed at a remote location and be in communication with the shovel machine 100 and the crusher machine 102. In one embodiment, each of the shovel machine 100 and the crusher machine 102 may include the control system 104. The two control systems 104 disposed in the shovel machine 100 and the crusher machine 102 may communicate with each other through the respective communication units 210.

Figure 3:
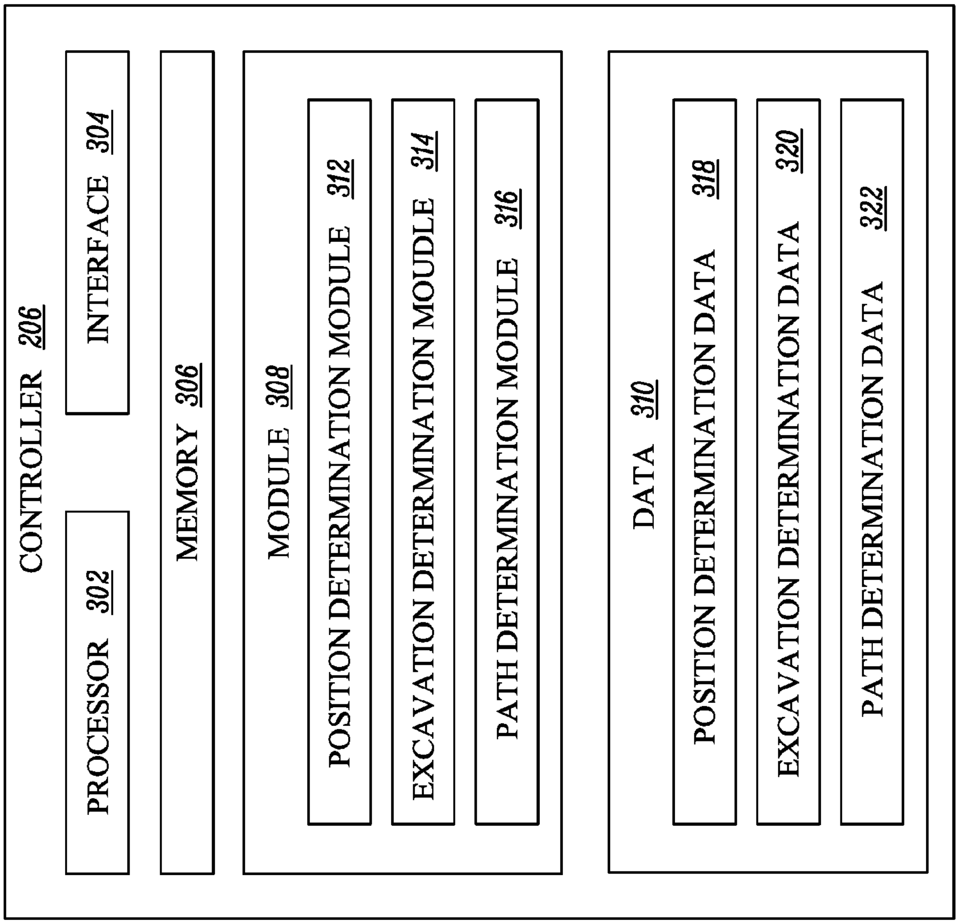
FIG. 3 is a block diagram of a controller of the control system, according to one embodiment of the present disclosure.

FIG. 3 illustrates the controller 206 of the control system 104, according to one embodiment of the present disclosure. The controller 206 includes a processor 302, one or more interfaces 304, and a memory 306 coupled to the processor 302. The processor 302 is configured to fetch and execute computer readable instructions stored in the memory 306. In one example, the processor 302 may be implemented as one or more microprocessors, microcomputers, microcontrollers, digital signal processors, central processing units, state machine, logic circuitries or any devices that manipulate signals based on operational instructions.

The interfaces 304 facilitate multiple communications within a wide variety of protocols and networks, such as a network, including wired network. In one example, the interface 304 may include a variety of software and hardware interfaces. In another example, the interfaces 304 may include, but are not limited to, peripheral devices, such as a keyboard, a mouse, an external memory, and a printer. In yet another example, the interfaces 304 may include one or more ports for connecting the controller 206 to a number of computing devices.

In one example, the memory 306 may include any non-transitory computer-readable medium known in the art. In one example, the non-transitory computer-readable medium may be a volatile memory, such as static random access memory and non-volatile memory, such as read only memory (ROM), erasable programmable ROM, and flash memory.

The controller 206 also includes modules 308 and data 310. The modules 308 include routines, programs, objects, components, data structures, etc., which perform particular tasks or implement particular abstract data types. In one embodiment, the modules 308 include a position determination module 312, an excavation determination module 314, and a path determination module 316. The data 310 inter alia includes repository for storing data processed, received, and generated by one or more of the modules 308. In one embodiment, the data 310 includes a position determination data 318, an excavation determination data 320, and a path determination data 322.

The position determination module 312 may be configured to determine a position of the shovel machine 100 and the crusher machine 102. The position determination module 312 may determine the position of the shovel machine 100 and the crusher machine 102 based on the data collected by the position data unit 204 of the control system 104. In one embodiment, details pertaining to the position determination module 312 may be stored in the position determination data 318.

The excavation determination module 314 may be configured to determine a plurality of excavation positions for the shovel machine 100. In one embodiment, the plurality of excavation positions may be determined based on the topography of the worksite as determined by the site monitoring unit 202 of the control system 104. An excavation position may be understood as a position of the shovel machine 100 where the implement 130 excavates the material from the worksite. Therefore, the implement 130 excavates the material when the shovel machine 100 reaches at one of the excavation positions. In one embodiment, details pertaining to the excavation determination module 314 may be stored in the excavation determination data 320.

The path determination module 316 may be configured to determine the travel paths for the shovel machine 100 and the crusher machine 102. The path determination module 316 may determine the travel paths with a plurality of loading positions. In one embodiment, a loading position may be understood as a position of the shovel machine 100 or the crusher machine 102 where the implement 130 of the shovel machine 100 loads the material into the hopper 148 of the crusher machine 102. In other words, the implement 130 may load the material into the hopper 148, when the shovel machine 100 or the crusher machine 102 is at one of the loading positions.

The determination of the loading positions by the path determination module 316 may be based at least in part on the positions of the shovel machine 100 and the crusher machine 102 with respect to each other. The path determination module 316 may determine the loading positions in such a manner that at each of the loading positions, the implement 130 of the shovel machine 100 may traverse an arc passing above the hopper 148. The implement 130 may move by traversing the arc for dumping the excavated material, and when the hopper 148 comes below a range of motion of the implement 130, the material can be dumped into the hopper 148.

In one example, the loading positions may be determined based on factors, such as dimensional characteristics of the implement system 112 of the shovel machine 100, dimensional characteristics of the crusher machine 102, and a type of the worksite.

In one embodiment, the site monitoring unit 302 may detect an obstacle in the travel path of one or both of the shovel machine 100 and the crusher machine 102. In another embodiment, the site monitoring unit 302 may detect an obstacle in the arc to be traversed by the implement 130. In such embodiments, the path determination module 316 may adjust or update the travel path based on the detection. In one embodiment, details pertaining to the path determination module 316 may be stored in the path determination data 322.

Figure 4:
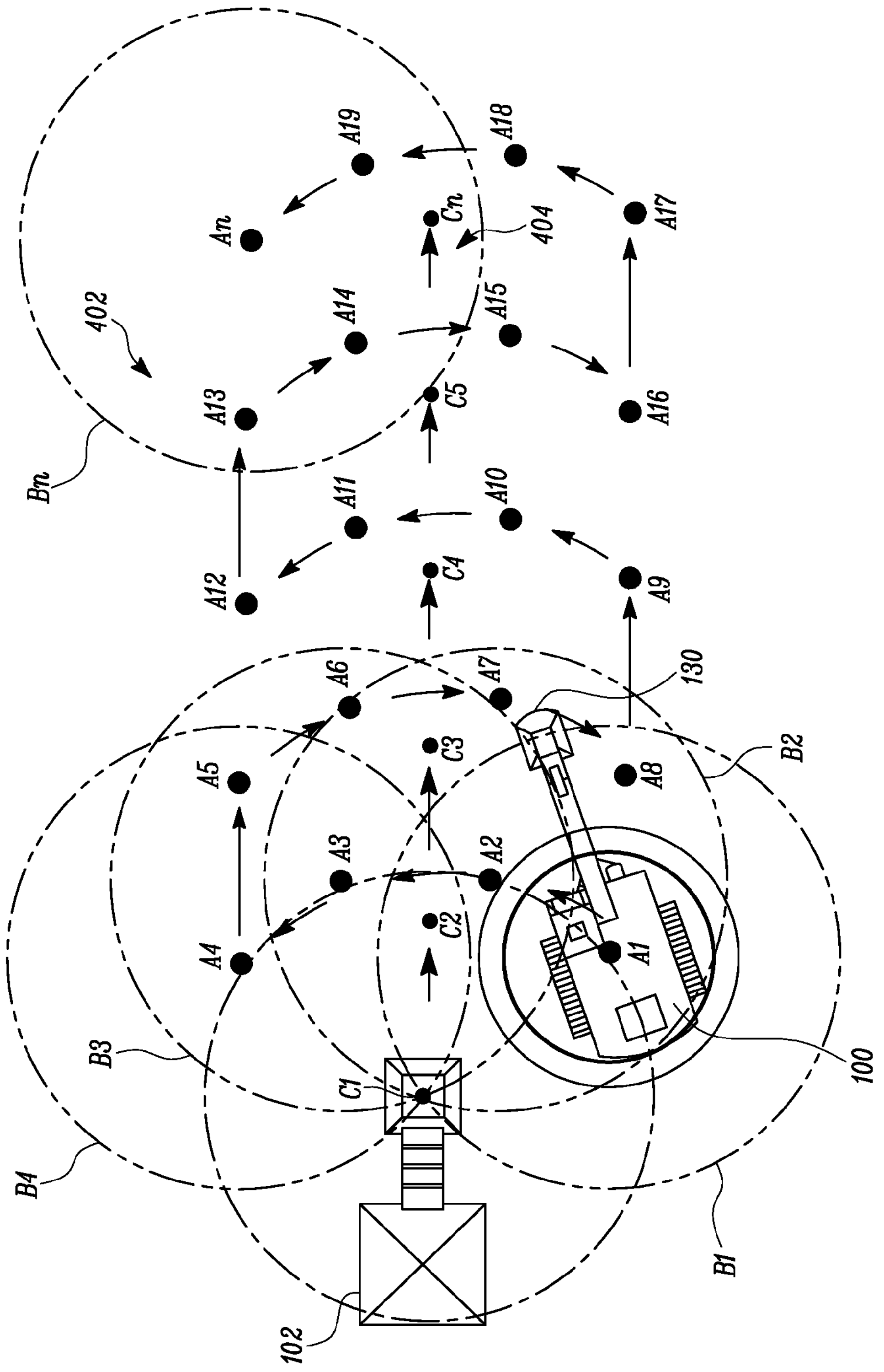
FIG. 4 is a diagrammatic top view of a first position of the excavating machine and the loading machine with respective exemplary travel paths, according to one embodiment of the present disclosure.

FIG. 4 illustrates a diagrammatic top view of a first position of the shovel machine 100 and the crusher machine 102 with respective travel paths, according to one embodiment of the present disclosure. The shovel machine 100 may follow a travel path 402 along the plurality of excavation positions $A_1, A_2, A_3, \ldots A_N$. While following the travel path 402, the shovel machine 100 may excavate the material, whenever the shovel machine 100 reaches each of the excavation points $A_1, A_2, A_3, \ldots A_N$. In one embodiment, each of the plurality of excavation positions and each of the plurality of loading positions for the shovel machine 100 may coincide with each other. Therefore, each of the excavation position $A_1, A_2, A_3, \ldots A_N$, may also represent the loading positions for the shovel machine 100. At each excavation position $A_1, A_2, A_3, \ldots A_N$, the implement system 112 of the shovel machine 100 may complete a 360° rotation while excavating the material and dumping the material into the hopper 148 of the crusher machine 102. The arcs followed by the implement system 112 while completing the 360° rotation are indicated by circles $B_1, B_2, B_3, \ldots B_N$. As shown in FIG. 4, the arcs $B_1, B_2, B_3, \ldots B_N$ are shown for the implement 130 of the shovel machine 100, when the shovel machine 100 is at the excavating/loading positions $A_1$, $A_2$, $A_3$, and $A_4$.

Further, the crusher machine 102 may follow a travel path 404 as shown by straight arrows in a horizontal direction along the plurality of loading positions $C_1, C_2, C_3, \ldots C_N$. At each of the loading positions $C_1, C_2, C_3, \ldots C_N$, the hopper 148 of the crusher machine 102 may come below the arc traversed by the implement system 112 of the shovel machine 100. In FIG. 4, the crusher machine 102 is shown to be positioned at the loading point $C_1$, when the shovel machine 100 follows the travel path 402 from the excavation position $A_1$ to $A_4$. Therefore, the shovel machine 100 and the crusher machine 102 may follow the travel paths 402, 404, respectively, in conjunction with each other, for performing the excavation and loading operation.

Figure 5:
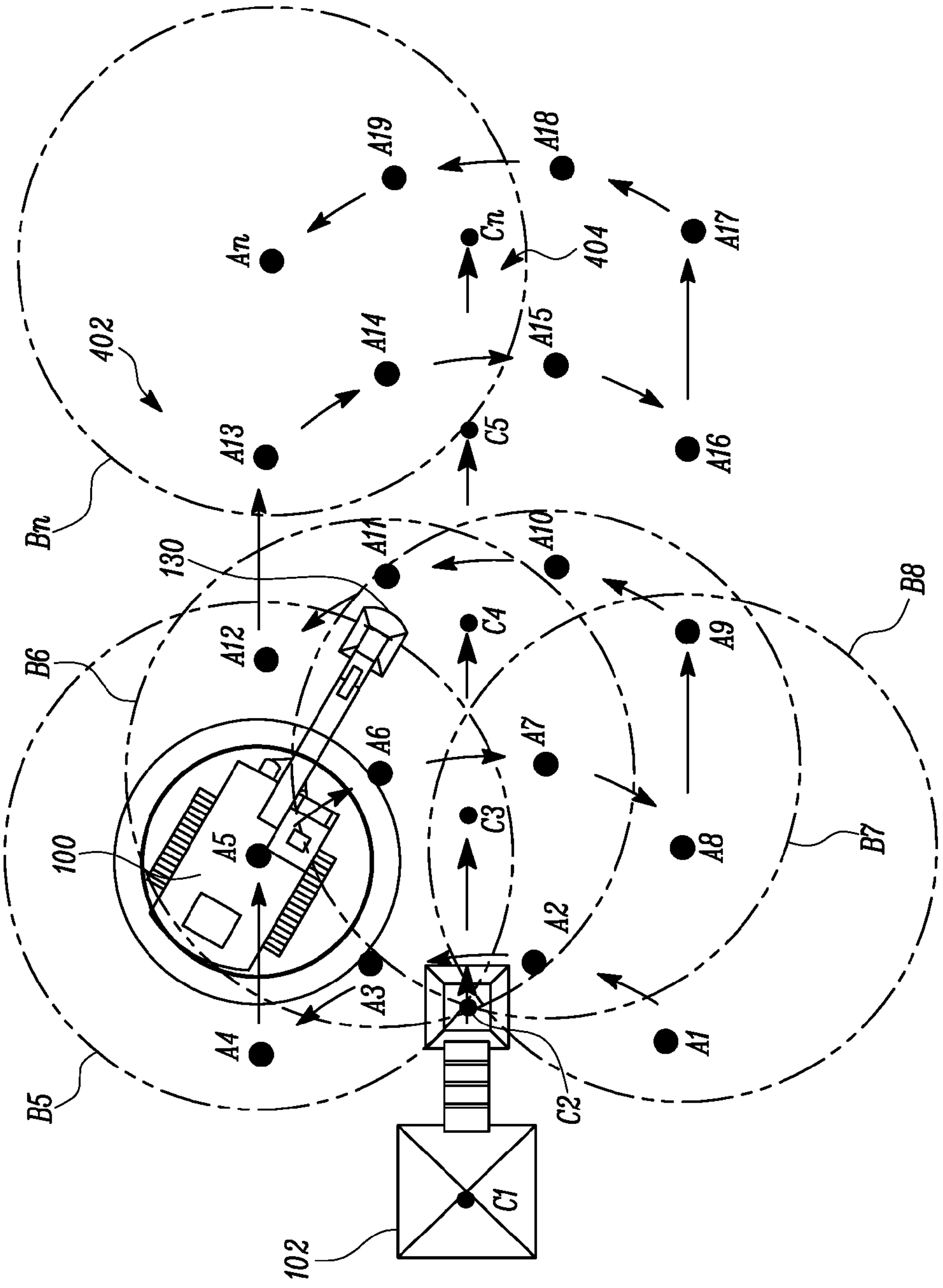
FIG. 5 is a diagrammatic top view of another position of the excavating machine and the loading machine on the respective exemplary travel paths, according to one embodiment of the present disclosure.

FIG. 5 illustrates a diagrammatic top view of another exemplary position of the shovel machine 100 and the crusher machine 102 on the respective exemplary travel paths 402, 404, according to one embodiment of the present disclosure. The arcs $B_1$, $B_2$, $B_3$, $B_N$ of the implement 130 of the shovel machine 100 are shown for the positions when the shovel machine 100 follows the travel path 402 from the excavating positions $A_5$ to $A_8$. Consequently, the crusher machine 102 moves to the next loading position $C_2$ along the travel path 404 in order to keep the hopper 148 below the arcs traversed by the implement 130, as the shovel machine 100 moves to the excavating positions $A_5$ to $A_8$.

Figure 6:
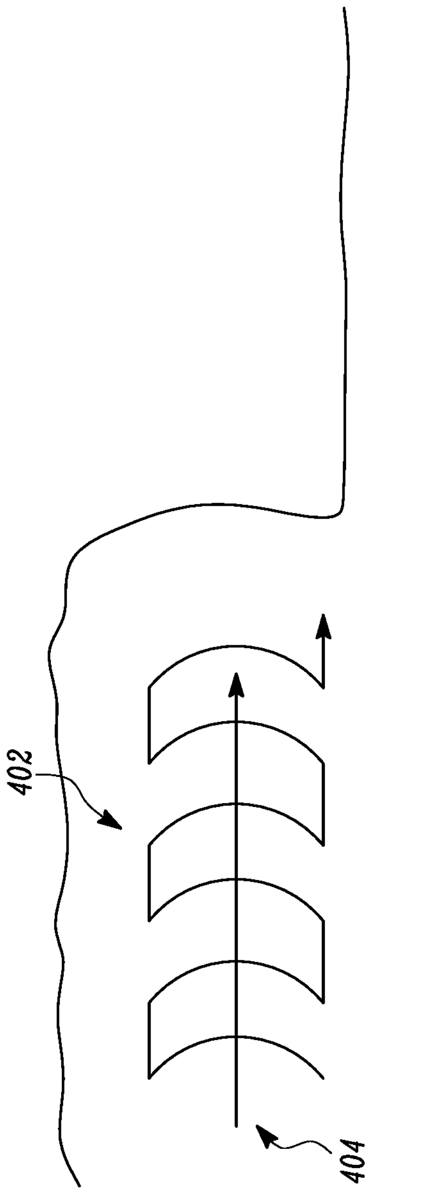
FIG. 6 is a line diagram indicating the exemplary travel paths of the excavating machine and the loading machine, according to one embodiment of the present disclosure.

FIG. 6 illustrates a line diagram indicating the exemplary travel paths 402, 404 of the shovel machine 100 and the crusher machine 102, respectively, according to the previous embodiment of the present disclosure.

INDUSTRIAL APPLICABILITY

The present disclosure relates to the excavating machine 100, the control system 104 implemented for the IPCC operations employing the excavating machine 100 and the loading machine 102, and a method 700 of implementing the IPCC operations. The control system 104 may be employed with any excavating machine 100 and any loading machine 102 known in the art. The control system 104 may be used for determining the travel paths for the excavating machine 100 and the loading machine 102 during the IPCC operations with the plurality of excavating positions and the plurality of loading positions. The travel paths may be determined in such a manner that during operation, at each of the plurality of loading positions, the implement 130 of the excavating machine 100 traverses an arc passing above the hopper 148 of the loading machine 102 disposed at the corresponding loading position.

Figure 7:
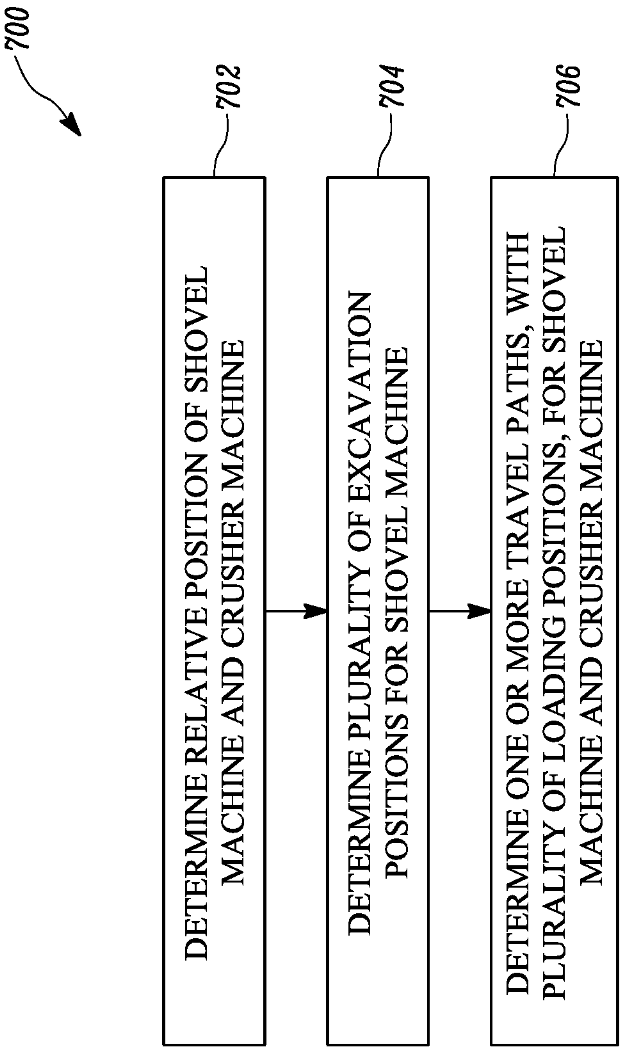
FIG. 7 is a flow chart depicting a method of implementing in-pit crushing and conveying (IPCC) operations employing the excavating machine and the loading machine, according to one embodiment of the present disclosure.

FIG. 7 illustrates a flow chart depicting the method 700 of implementing the IPCC operations employing the shovel machine 100 and the crusher machine 102, according to one embodiment of the present disclosure. For the sake of brevity, some of the features of the present disclosure that are already explained in the description of FIG. 1 to FIG. 6 are not explained in detail.

At step 702, the method 700 includes determining a relative position of the shovel machine 100 and the crusher machine 102. The relative position of the shovel machine 100 and the crusher machine 102 may be determined based on one or more of GPS, GNSS, the trilateration or triangulation of cellular networks or Wi-Fi networks, Pseudo satellites (Pseudolite), ranging radios, and the perception sensors. In one embodiment, the position determination module 312 of the control system 104 may determine the relative position of the shovel machine 100 and the crusher machine 102.

At step 704, the method 700 includes determining the plurality of excavation positions for the shovel machine 100. The plurality of excavation positions may be determined based on the topography of the worksite. The implement 130 of the shovel machine 100 may excavate the material from the worksite when the shovel machine 100 is at one of the plurality of excavation positions. In one embodiment, the excavation determination module 314 of the control system 104 may determine the plurality of excavation positions for the shovel machine 100.

At step 706, the method 700 includes determining the travel paths for the shovel machine 100 and the crusher machine 102 with the plurality of loading positions. When the shovel machine 100 and the crusher machine 102 are at one of the plurality of loading positions, the implement 130 may load the material into the hopper 148. The plurality of loading positions may be based on the relative position of the shovel machine 100 and the crusher machine 102 and the plurality of excavation positions. The plurality of loading positions may be determined such that at each of the plurality of loading positions, the implement 130 traverses the arc passing above the hopper 148.

The method 700 further includes displaying the travel paths to the operators of the shovel machine 100 and the crusher machine 102. Further, the travel paths may be adjusted or updated based on detection of one or more obstacles in the travel paths or in the arc traversed by the implement 130. The method 700 further includes operating the traction units 108 and the ground engaging members 146 of the shovel machine 100 and the crusher machine 102, respectively, in such a manner that the shovel machine 100 and the crusher machine 102 travel within the predefined limits of the travel paths.

The control system 104 and the method 700 of the present disclosure offer a convenient approach for carrying out the IPCC operations employing the shovel machine 100 and the crusher machine 102. The determination of the excavation positions and the loading positions assists in providing systematic and productive travel paths for the shovel machine 100 and the crusher machine 102 for performing a variety of operations. The travel paths of the shovel machine 100 and the crusher machine 102 are developed in such a way that the implement 130 of the shovel machine 100 passes above the hopper 148 of the crusher machine 102. This would reduce the wastage of material while dumping the material from the implement 130 into the hopper 148. Also, the travel paths of the shovel machine 100 and the crusher machine 102 may be determined in such a manner so as to minimize the swing of the implement 130 for the shovel machine 100 or travel distance to dump the material into the hopper 148 for the crusher machine 102.

Also, as may be seen from the line diagram of FIG. 6, the control system 104 provides a straight line travel path 404 for the crusher machine 102. The crusher machine 102 is, typically, a heavy machine extending along the length of the conveyor, and therefore it may be hard for the crusher machine 102 to make frequent turns. Therefore, the straight line travel path 104, as generated by the control system 104, would result in greater efficiency of the operation with respect to the crusher machine 102.

Further, an overall accuracy of the excavation and loading operation is also significantly improved. In addition, due to the predefined travel paths of the shovel machine 100 and the crusher machine 102, the dependence of quality of the operations on the skill-set of the operators is significantly reduced. Moreover, the coordinated operations of the shovel machine 100 and the crusher machine 102 would lead to effective and time-saving excavation and loading of the material. Therefore, the control system 104 of the present disclosure offers an effective, easy, productive, flexible, time-saving, convenient, safer, and cost-effective way for performing the IPCC operations.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A control system implemented for in-pit crushing and conveying (IPCC) operations employing a shovel machine and a crusher machine, the shovel machine having an implement configured to excavate a material from a worksite and load the material into a hopper of the crusher machine, the control system comprising:

a position determination module configured to determine a relative position of the shovel machine and the crusher machine;

an excavation determination module configured to determine a plurality of excavation positions for the shovel machine, wherein the implement excavates the material from the worksite when the shovel machine is at one of the plurality of excavation positions; and a path determination module configured to determine one or more travel paths, with a plurality of loading positions, for the shovel machine and the crusher machine, the plurality of loading positions based at least in part on the relative position of the shovel machine and the crusher machine and the plurality of excavation positions, such that at each of the plurality of loading positions the implement traverses an arc passing above the hopper.

2. The control system of claim 1, wherein each of the plurality of excavation positions and each of the plurality of loading positions for the shovel machine coincide with each other.

3. The control system of claim 1 further comprising, one or more traction control units configured to operate the shovel machine and the crusher machine such that the shovel machine and the crusher machine travel within predefined limits of the one or more travel paths during the IPCC operation.

4. The control system of claim 1 further comprising, one or more operator interface units configured to display the one or more travel paths for one or more operators of the shovel machine and the crusher machine.

5. The control system of claim 1 further comprising, a position data unit configured to collect position data of the shovel machine and the crusher machine using one or more of Global Positioning System (GPS), Global Navigation Satellite System (GNSS), trilateration/triangulation of cellular networks or Wi-Fi networks, Pseudo satellites (Pseudolite), ranging radios, and the perception sensors, wherein the position determination module is configured to determine the relative position of the shovel machine and the crusher machine based on the position data.

6. The control system of claim 1 further comprising, a site monitoring unit configured to determine topography of the worksite, wherein the excavation determination module is configured to determine the plurality of excavation positions based on the topography of the worksite.

7. The control system of claim 6, wherein the site monitoring unit is further configured to detect one or more obstacles in the one or more travel paths and in the arc traversed by the implement, and wherein the path determination module is configured to adjust the one or more travel paths based on the detection of the one or more obstacles.

8. A method of implementing in-pit crushing and conveying (IPCC) operations employing a shovel machine and a crusher machine, the shovel machine having an implement configured to excavate a material from a worksite and load the material into a hopper of the crusher machine, the method comprising:

determining a relative position of the shovel machine and the crusher machine;

determining a plurality of excavation positions for the shovel machine, wherein the implement excavates the material from the worksite when the shovel machine is at one of the plurality of excavation positions; and determining one or more travel paths, with a plurality of loading positions, for the shovel machine and the crusher machine, the plurality of loading positions based at least in part on the relative position of the shovel machine and the crusher machine and the plurality of excavation positions, such that at each of the plurality of loading positions the implement traverses an arc passing above the hopper.

9. The method of claim 8, wherein each of the plurality of excavation positions and each of the plurality of loading positions for the shovel machine coincide with each other.

10. The method of claim 8 further comprising, operating the shovel machine and the crusher machine such that the shovel machine and the crusher machine travel within predefined limits of the one or more travel paths during the IPCC operation.

11. The method of claim 8 further comprising, displaying the one or more travel paths for one or more operators of the shovel machine and the crusher machine.

12. The method of claim 8 further comprising, determining the relative position of the shovel machine and the crusher machine based on one or more of Global Positioning System (GPS), Global Navigation Satellite System (GNSS), trilateration/triangulation of cellular networks or Wi-Fi networks, Pseudo satellites (Pseudolite), ranging radios, and the perception sensors.

13. The method of claim 8 further comprising, determining the plurality of excavation positions based on topography of the worksite.

14. The method of claim 8 further comprising, adjusting the one or more travel paths based on the detection of one or more obstacles in the one or more travel paths or in the arc traversed by the implement.

15. An excavating machine comprising:

one or more traction units;

a frame supported on the one or more traction units, a body supported on the frame, the body configured to rotate with respect to the frame, about an axis of rotation;

an arm pivotally extending from the body from a first end;

an implement coupled to the arm at a second end; and a control system comprising:

a position determination module configured to determine a position of the excavating machine relative to a loading machine;

an excavation determination module configured to determine a plurality of excavation positions for the excavating machine, wherein the implement excavates a material from a worksite when the excavating machine is at one of the plurality of excavation positions; and a path determination module configured to determine a travel path for the excavating machine, with a plurality of loading positions, relative to the loading machine, the plurality of loading positions based at least in part on the position of the excavating machine relative to the loading machine and the plurality of excavation positions, such that at each of the plurality of loading positions the implement traverses an arc passing above the loading machine as the body rotates with respect to the frame about the axis of rotation.

16. The excavating machine of claim 15, wherein each of the plurality of excavation positions and each of the plurality of loading positions coincide with each other.

17. The excavating machine of claim 15 further comprising, a traction control unit configured to operate the one or more traction units, such that the excavating machine travels within predefined limits of the travel path.

18. The excavating machine of claim 15 further comprising, a site monitoring unit configured to:

determine topography of the worksite; and detect one or more obstacles in the travel path and in the arc traversed by the implement;

wherein the excavation determination module is configured to determine the plurality of excavation positions based on the topography of the worksite; and wherein the path determination module is configured to adjust the travel path based on the detection of the one or more obstacles.

19. The excavating machine of claim 15 further comprising, a communication unit configured to signal the travel path to a corresponding communication unit of the loading machine.

20. The excavating machine of claim 15 selected from one of a shovel machine, an electric mining machine, and a back-hoe loader.

* * * * *